US011752811B2

(12) United States Patent
Hinz et al.

(10) Patent No.: US 11,752,811 B2
(45) Date of Patent: Sep. 12, 2023

(54) TIRE PRESSURE CONTROL VALVE ASSEMBLY

(71) Applicant: Tire Pressure Control International Ltd., Edmonton (CA)

(72) Inventors: Lesley Joseph Hinz, Spruce Grove (CA); Brian Douglas Spreen, Parkland County (CA)

(73) Assignee: Tire Pressure Control International Ltd., Edmonton (CA)

( * ) Notice: Subject to any disclaimer, the term of this patent is extended or adjusted under 35 U.S.C. 154(b) by 546 days.

(21) Appl. No.: 16/166,690

(22) Filed: Oct. 22, 2018

(65) Prior Publication Data

US 2020/0122525 A1 Apr. 23, 2020

(30) Foreign Application Priority Data

Oct. 17, 2018 (CA) .................................. CA 3021190

(51) Int. Cl.
*B60C 23/00* (2006.01)
*B60C 23/04* (2006.01)

(52) U.S. Cl.
CPC ...... *B60C 23/00354* (2020.05); *B60C 23/002* (2013.01); *B60C 23/00305* (2020.05); *B60C 23/0493* (2013.01); *B60C 23/0408* (2013.01); *B60C 2200/04* (2013.01); *B60C 2200/06* (2013.01)

(58) Field of Classification Search
CPC ............ B60C 23/003; B60C 23/00309; B60C 23/00318
See application file for complete search history.

(56) References Cited

U.S. PATENT DOCUMENTS 4,583,566 A 4/1986 Kalavits et al.
5,180,456 A 1/1993 Schultz et al.
(Continued)

FOREIGN PATENT DOCUMENTS

| CA | 2 970 014 A1 | 8/2018 | |
| CN | 201011582 Y | 1/2008 | |
| JP | 2987969 B2 * | 12/1999 | ....... B60C 23/00309 |

OTHER PUBLICATIONS

Machine Translation of JP 2987969 B2 (Tanaka et al.), 11 pages (Year: 1999).*

(Continued)

*Primary Examiner* — Jason R Bellinger
*Assistant Examiner* — Emily G. Castonguay
(74) *Attorney, Agent, or Firm* — Finch & Maloney PLLC

(57) ABSTRACT

A valve assembly for a tire pressure control system used to control tire pressure of a vehicle has a unitary body and one or more valves. The unitary body has attachment points for mounting the unitary body to a vehicle wheel end, one or more valve cavities formed in the unitary body, and a plurality of air passages formed in the unitary body. The plurality of air passages have an air supply passage that is connectable to an air supply and a tire supply chamber for connecting to a tire of the vehicle. The air supply passage and the tire supply chamber are connected to each of the one or more valve cavities. Each valve has a valve element mounted to the valve cavity, an air supply chamber in communication with the air supply passage, and a tire supply chamber in communication with the tire supply passage.

16 Claims, 6 Drawing Sheets

(56) References Cited

U.S. PATENT DOCUMENTS

| | | | |
|---|---|---|---|
| 5,249,609 A | 10/1993 | Walker et al. | |
| 5,398,743 A * | 3/1995 | Bartos | B60C 23/003 |
| | | | 137/225 |
| 5,429,167 A * | 7/1995 | Jensen | B60C 23/003 |
| | | | 152/415 |
| 5,516,379 A | 5/1996 | Schultz | |
| 5,587,698 A | 12/1996 | Genna | |
| 6,144,295 A | 11/2000 | Adams et al. | |
| 6,626,502 B1 * | 9/2003 | Petrak | B60B 3/147 |
| | | | 301/35.629 |
| 6,666,078 B1 | 12/2003 | Claussen et al. | |
| 6,758,088 B2 | 7/2004 | Claussen et al. | |
| 7,240,542 B2 | 7/2007 | Gustafsson et al. | |
| 8,069,890 B2 * | 12/2011 | Resare | B60C 23/003 |
| | | | 152/417 |
| 8,115,613 B2 | 2/2012 | Patel et al. | |
| 8,744,679 B2 | 6/2014 | Boss et al. | |
| 9,132,704 B2 * | 9/2015 | Wilson | B60C 23/007 |
| 2005/0194080 A1 | 9/2005 | White et al. | |
| 2008/0185086 A1 * | 8/2008 | Ingram | B60C 23/003 |
| | | | 152/417 |
| 2013/0282233 A1 | 10/2013 | Hsia | |
| 2015/0005982 A1 | 1/2015 | Muthukumar | |
| 2018/0072112 A1 * | 3/2018 | Lee | B60C 23/004 |
| 2018/0104993 A1 | 4/2018 | Gillen | |
| 2018/0345740 A1 * | 12/2018 | Vitolo | B60C 23/003 |
| 2019/0283512 A1 * | 9/2019 | Blessing | B60C 23/003 |

OTHER PUBLICATIONS ieeexplore.ieee.org/document/5229915, "Design of tire pressure monitoring system based on resonance frequency method", available as early as Jul. 9, 2015.

* cited by examiner

TIRE PRESSURE CONTROL VALVE ASSEMBLY

TECHNICAL FIELD

This relates to a valve assembly used in a system for controlling the tire pressure of a vehicle, and a method of manufacturing the valve assembly.

BACKGROUND

Tire pressure control systems are used to increase and decrease the pressure of a vehicle to improve the vehicle's operation. For example, when travelling on highways, a higher tire pressure results in better fuel economy, whereas when traversing soft ground such as mud or sand, a vehicle may have better traction at lower tire pressures.

Various systems are available that allow tire pressure changes to be automated, such as U.S. Pat. No. 5,587,698 (Genna) entitled "Automatic tire pressure control system for a vehicle" which describes a system that automatically adjusts the pressure in vehicle tires in respond to air pressure and temperature fluctuations.

SUMMARY

According to an aspect, there is provided a valve assembly for a tire pressure control system used to control tire pressure of a vehicle. The valve assembly comprises a unitary body and one or more valves. The valve assembly comprising attachment points for mounting the unitary body to a vehicle wheel end, one or more valve cavities formed in the unitary body, and a plurality of air passages formed in the unitary body. The plurality of air passages comprise an air supply passage for connecting to an air supply and a tire supply passage for connecting to a vehicle tire. The air supply passage and the tire supply passage are connected to each of the one or more valve cavities. Each of the one or more valves comprises a valve element mounted to the valve cavity, an air supply chamber in communication with the air supply passage, and a tire supply chamber in communication with the tire supply passage. The air supply chamber and the tire supply chamber are defined by the valve cavity and the valve element. The valve element is biased toward a closed position that seals between the air supply chamber and the tire supply chamber, the valve element moving to an open position that permits airflow between the air supply chamber and the tire supply chamber upon application of a predetermined pressure within the valve cavity against the valve element.

According to other aspects, the valve assembly may comprise one or more of the following features, alone or in combination: each valve may comprise a cover that overlies the valve cavity and the valve element, where an inner surface of the cover defines a cover cavity; the valve element may comprise a diaphragm secured between the valve cavity and the cover cavity, wherein the diaphragm is exposed to the tire pressure on a valve-facing side of the diaphragm and atmospheric pressure on a cover-facing side of the diaphragm; the diaphragm may be biased by a spring element positioned between the cover and the diaphragm; the cover may comprise a vent that vents the cover cavity to atmosphere; the valve assembly may further comprise an air supply connector in communication with each of the air supply passages, where the air supply connector is rotatable relative to the unitary body, and the air supply connector is connected to an air supply hose from an air supply; each air supply passage may comprise a flow restriction that restricts the rate of pressure reduction during a deflation operation through the valve cavity; each tire supply passage may comprise a supplemental port for selectively connecting an alternate air passage from the air supply to the tire supply passage; and the attachment points of the valve assembly may comprise a set of apertures sized and aligned to receive two or more tire studs of a tire wherein the attachment points may comprise a plurality of sets of apertures sized to mount to different tire stud patterns.

According to an aspect, there is provided a method of manufacturing a valve assembly. The method comprises the steps of:

obtaining a unitary body having a first face, a second face opposite the first face and separated by a thickness;

machining the unitary body to form attachment points for mounting the unitary body to a vehicle wheel end, and one or more valve cavities formed in the unitary body, each of the one or more valve cavities being connected to an air supply passage that is connectable to an air supply and a tire supply passage that is connectable to a vehicle tire, wherein each of the air supply passage and the tire supply passage are formed in the unitary body;

mounting a valve element to each of the one or more valves such that the valve element defines an air supply chamber in communication with the air supply passage and a tire supply chamber in communication with the tire supply passage; and biasing the valve element toward a closed position that seals between the air supply chamber and the tire supply chamber such that the valve element moves to an open position that permits airflow between the air supply chamber and the tire supply chamber upon application of a predetermined pressure within the valve cavity against the valve element.

According to other aspects, the method may comprise one or more of the following features, alone or in combination: mounting a valve element may comprise mounting a cover to the unitary body that overlies the valve cavity and the valve element, wherein an inner surface of the cover may define a cover cavity, and wherein the valve element may comprise a diaphragm secured between the valve cavity and the cover cavity, such that the diaphragm is exposed to the tire pressure on a valve-facing side of the diaphragm and atmospheric pressure on a cover-facing side of the diaphragm; biasing the valve element may comprise biasing the diaphragm by a spring element positioned between the cover and the diaphragm; the cover cavity may comprise a vent that is vented to atmosphere; the method may further comprise the steps of attaching an air supply connector to the unitary body in communication with each of the air supply passages, the air supply connector being rotatable relative to the unitary body, and connecting the air supply connector to an air supply hose from an air supply; machining the air supply passages may comprise forming a flow restriction that restricts the rate of pressure reduction during a deflation operation through the valve cavity; machining the tire supply passage may comprise machining a supplemental port in fluid connection with the tire supply passage; attachment points may comprise a set of apertures sized and aligned to receive two or more tire studs of a tire; and the attachment points may comprise a plurality of sets of apertures sized to mount to different wheel end stud patterns.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
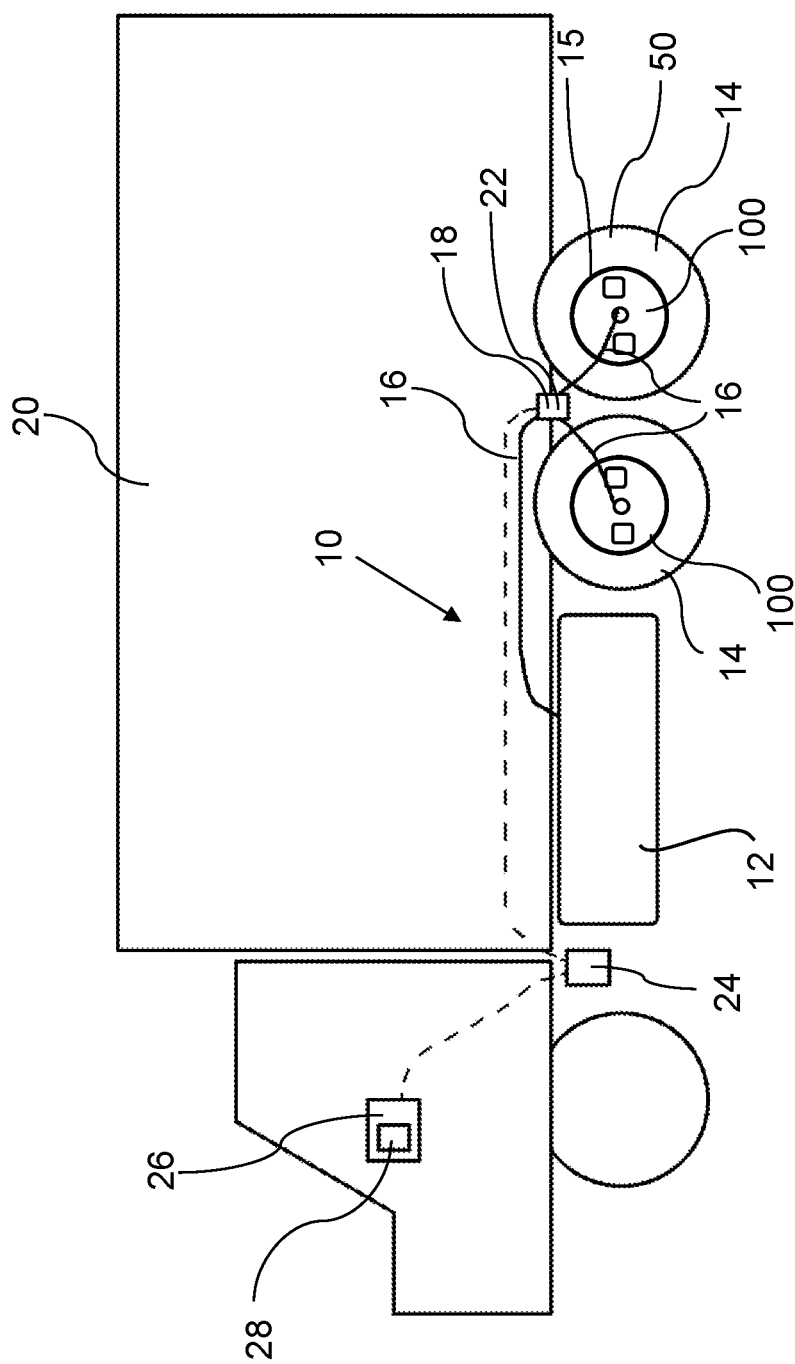
FIG. 1 is a tire pressure control system shown on a vehicle.

Referring to FIG. 1, an example of a tire pressure control system, generally identified by reference numeral 10, is shown, with valve assemblies 100 mounted to vehicle tires 14. In the depicted example, tire pressure control system 10 uses sensors and a microcontroller 24 to determine the current tire pressure, and control the tire pressure changes when adjusting to a different tire pressure. In some examples, such as the system described in Canadian patent application no. 2,970,014 entitled "Tire Pressure Control System", microcontroller 24 may use algorithms that allow the system to effectively learn how the vehicle air supply 12 and tire groups 50 are configured, and optimize the inflation and deflation control of the tires 14, while continually learning these parameters during normal operation. The system may also offer the ability to autonomously control tire pressures without operator intervention based on data from other sensors. The discussion with respect to FIG. 1 relates to a particular system that uses a controller and automation intended to improve the efficiency and usability of the system. However, it will be understood that this is merely an example of a possible system, and that valve assemblies 100 may be used in other tire pressure control systems. For example, valve assemblies 100 may be used in manual systems that rely on manual intervention to increase or decrease the tire pressure, where valve assemblies 100 direct the flow of air to or from tires 14.

As shown in FIG. 1, one example of a tire pressure control system 10 uses a supply of compressed air 12 that is connected to supply compressed air to the vehicle tires 14 through an air conduit 16, and controlled by a control valve 18. The supply of compressed air 12 may be any suitable source, such as an existing air supply system that is commonly found on some transport vehicles 20 as shown, which typically includes a tank and a compressor, or may be an additional or dedicated air supply system installed on the vehicle 20, which will typically also include at least a compressor. The conduit 16 and valve assemblies 100 used to connect between the air supply 12 and the tires 14 may have various configurations based on the preferences of the user and the intended use. For example, as will be discussed below, each valve assembly 100 may control one tire 14, or a group of tires 14 that are connected in parallel downstream of valve assembly 100. In the depicted example, a single control valve 18 is used to control inflation and deflation of a group of tires 14 in a double-axle vehicle 20, where the wheels are controlled in axle groups 50, where axle group 50 refers to a set of tires on one side of vehicle 20. Preferably, as will be discussed below, valve assembly 100 is designed to prevent a failure of one tire, such as loss of pressure due to a puncture, etc., from causing other tires connected to the same valve assembly 100 to lose pressure as well.

In the depicted example, the pressure in tires 14 is detected by air pressure sensors 22, which may be included at any convenient location, such as with valves 18, valve assembly 100, tires 14, air conduits 16, etc. Valves 18 are controlled by microcontroller 24 to control the supply of compressed air to the vehicle tires 14 via valve assemblies 100 to increase the air pressure in the vehicle tires 14, and to vent compressed air from the vehicle tires 14 to atmosphere to decrease the air pressure. If present, microcontroller 24 may be provided with different degrees of utility. For example, microcontroller 24 may be programmed to simply respond to user inputs, or it may be programmed with instructions to calculate a valve operation that may be initiated when a signal is received. Such as signal may originate from any number of sources such as an operator interface 26, air pressure sensors 18, or other sensors 28.

Figure 2:
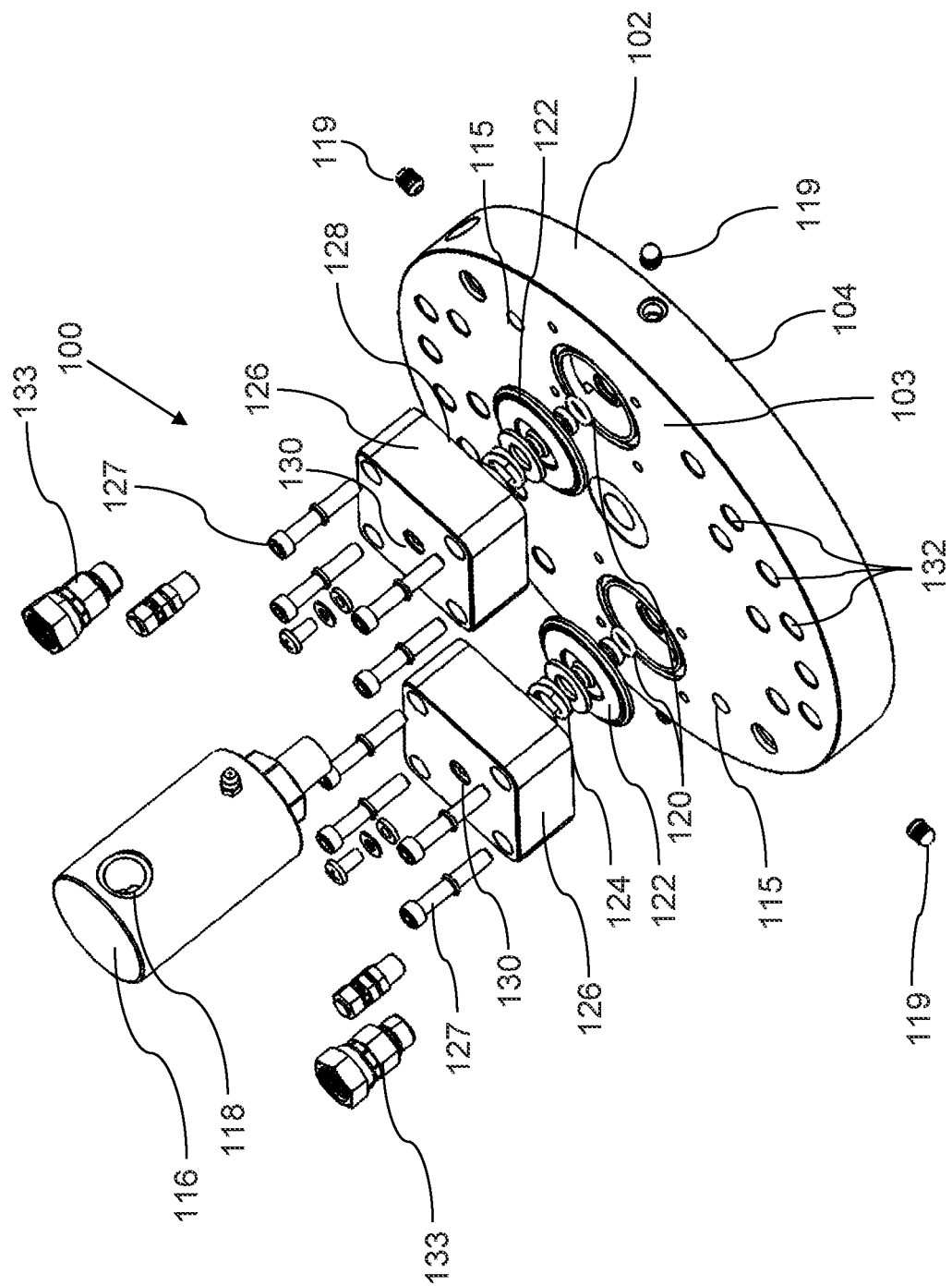
FIG. 2 is a perspective, exploded view of the tire pressure control valve assembly.

Referring to FIG. 2, valve assembly 100 is formed from a unitary body 102 that has a first face 103, and a second face 104 opposite to first face 103. Unitary body 102 has a thickness that allows various elements, such as passages and cavities described below, to be formed. The thickness may not be uniform, and portions may be cut away to reduce the weight and amount of material required. Various manufacturing techniques may be used to form these elements depending on the material of unitary body 102. In the preferred embodiment, where unitary body 102 is made from aluminum due to its cost and material properties, the elements may be effectively formed by machining. Other materials may be used, such as steel, nylon, which may require or permit different manufacturing techniques as is known in the art.

Figure 3:
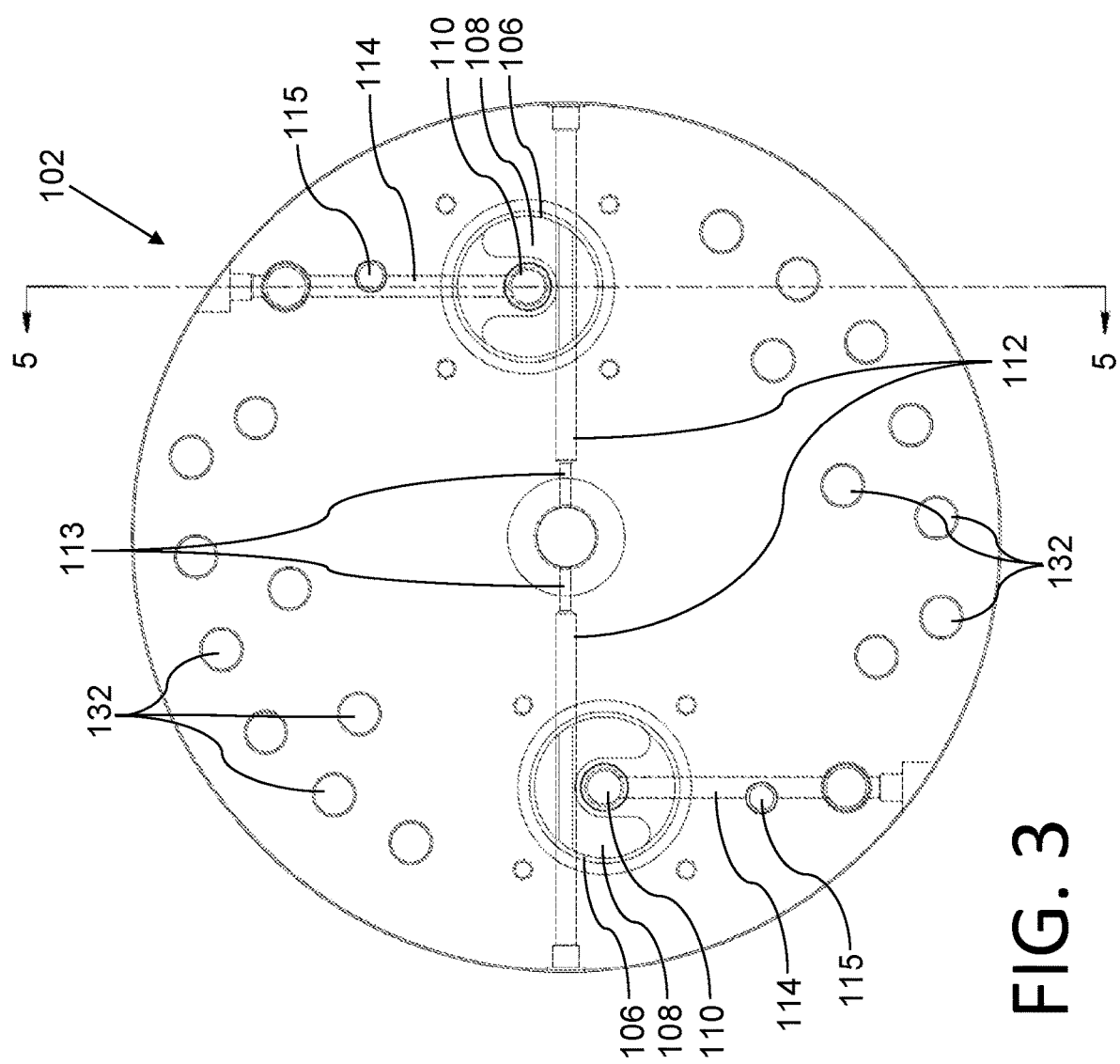
FIG. 3 is a partially transparent top plan view of a unitary body of the valve assembly.
Figure 4:
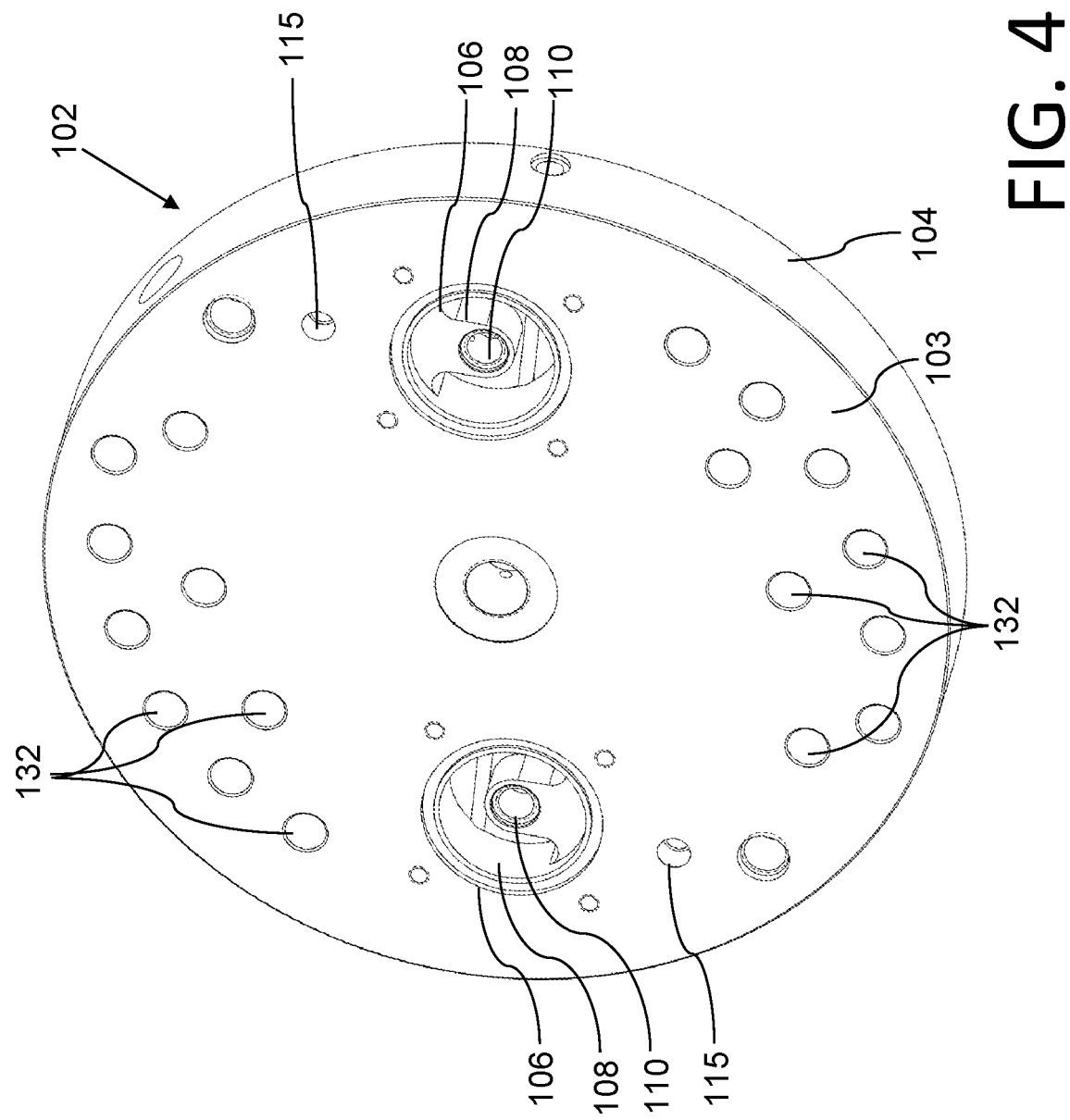
FIG. 4 is a perspective view of a unitary body of the valve assembly.

Unitary body 102 has one or more valves 120, such as two as shown in the depicted example, that are intended to be used for a double-wide tire set. Valve 120 has a valve cavity 106 formed, such as by machining, in first face 103 of unitary body 102, and a valve element 122. Valve cavity 106 may be described as being integrally formed, in that it is formed directly in unitary body 102. Valve cavity 120 may be further defined by other components installed within or adjacent thereto, in addition to valve element 122 which is part of valve 120. Valve 120 has an air supply chamber 108 and tire supply chamber 110, as shown in FIGS. 3 and 4. As depicted, chambers 108 and 110 are formed within valve cavity 106. Valve element 122 is biased toward a closed position, such as by a spring element 124. In the closed position, valve element forms a seal between air supply chamber 108 and tire supply chamber 110. Upon application of a predetermined force within valve cavity 106 against valve element 122, valve element 122 will move toward an open position, allowing airflow between supply chamber 108 and tire supply chamber 110. Preferably, the predetermined force required to open valve element 122 corresponds with a pressure threshold within chambers 108 and 110, where the force relates to the pressure and the surface area exposed to that area, as will be discussed in greater detail below. In the depicted example, valve element 122 is a sealing diaphragm that sits over valve cavity 106, and is sealed along it outer edge. As a diaphragm, valve element 122 moves toward valve cavity 106, and seals between chambers 108 and 110 by engaging a profile that separates the chambers. Valve element 122 as shown has a spring element 124 positioned behind valve element 122 to bias valve element 122 toward the closed position. It has been found that this type of valve provides a sufficiently reliable and simple design for the intended purpose. However, it will be understood that there are various designs that may be used for valve closure and various ways in which the valve closure may be biased.

The depicted example has a valve cover 126 that is fastened overtop of valve element 122 and valve cavity 106. Valve cover 126 is attached using bolts 127. Valve cover 126 has a cover cavity 128 that receives some or all of valve element 122. When installed, valve cover 126 secures valve element 122 relative to valve cavity 106, and provides support for spring element 124. It will be understood that other design options are available. For example, valve cover 126 may depend on the type of valve element 122, the way in which valve element 122 is biased, the type of spring element 124 if present, etc. Preferably, and as depicted, valve element 122 will be exposed to air pressure on one side and atmospheric air on the other side. As depicted, this is accomplished by providing valve cover 126 with a vent, such as an orifice 130 that allows cover cavity 128 to be vented to atmosphere, such that the cover-facing side of valve element 122 maintained at atmospheric pressure and the valve facing side of valve element 122 is exposed to the tire pressure.

In addition to valve cavities 106, air supply passages 112 and tire supply passages 114 are formed in unitary body 102. Referring to FIGS. 2 and 3, air supply passages 112 are used to connect between air supply chamber 108 and air supply 12 via supply hoses 118. As air supply 12 is stationary relative to vehicle 20, and rotates relative to tires 14, including the valve stem (not shown), it is necessary to provide a rotating part. As depicted, this is done by providing an air supply connector 116 that capable of rotating relative to unitary body 102. This allows air supply passage 112 and air supply 12 to be connected, while still allowing for relative rotation of the various components. Air supply connector 116 will generally have a bearing and seal assembly (not shown) that permits rotation, while maintaining air pressure within air supply passage 112. As can be seen, air supply connector 116 is able to rotate at the point at which it attaches to unitary body 102. It will be understood that any suitable assembly may be used for this purpose, and that the point at which rotation occurs may vary.

Air supply connector 116, shown in FIG. 2, is preferably in communication with each air supply passage 112 in unitary body 102 as shown in FIG. 3, and has a connection 118 to air supply hose 16, which is shown in FIG. 1. Referring to FIG. 1, air supply hose 16 is in turn connected to air supply 12 via valve 18. Referring to FIG. 3, each air supply passage 112 may include a flow restriction 113 to restrict the rate of air flow through air supply passage. When used, flow restriction 113 is preferably designed and sized to maintain a predetermined pressure profile within valve 120, shown in FIG. 2, to maintain valve 120 in the open position. Under normal operation, this controls the rate of change of pressure within valve 120 such that valve 120 is maintained in the open position throughout the operation, even though the pressure at control valve 18 (shown in FIG. 1) may be much higher or lower than the instantaneous pressure within tire 14. On the other hand, in the event of a failure in the system, such as a punctured tire or ruptured air hose, the pressure within valve 120 will drop quickly due to air escaping through tire supply passage 114. The rapid drop in pressure toward atmospheric pressure, once it exceeds the designed threshold, will cause valve 120 to close, and isolating the failed tire 14 to prevent air pressure from being lost elsewhere in the rest of the tire system. For example, when valve assembly 100 is connected to multiple separate tires 14, a loss in pressure in one tire 14 would otherwise result in a loss of pressure in all tires connected in series.

As noted above, air supply passages 112 for separate tires 14 that are formed in the same unitary body 102 may be connected in parallel, allowing a single air supply 12 and control valve 18 to control the air pressure in axle group 50 simultaneously. When sufficient pressure is in the system, valve elements 122 will be in the open position and will not restrict the flow to the respective tires 14. This also allows air to pass between different tires 14 connected to the same valve assembly 100. Connected tires 14 will automatically balance pressure in response to external stimuli that may compress tires 14 within axle group 50 unequally, such as uneven ground, obstacles, etc. without the intervention of microcontroller 24.

Figure 5:
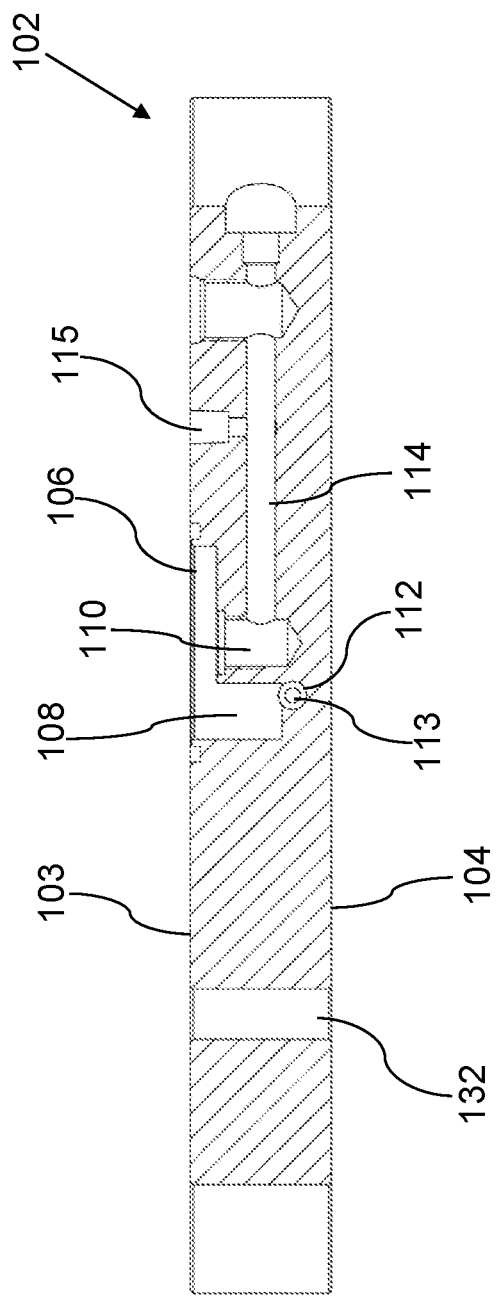
FIG. 5 is side elevation view in section of the unitary body along line 5-5 shown in FIG. 3.
Figure 6:
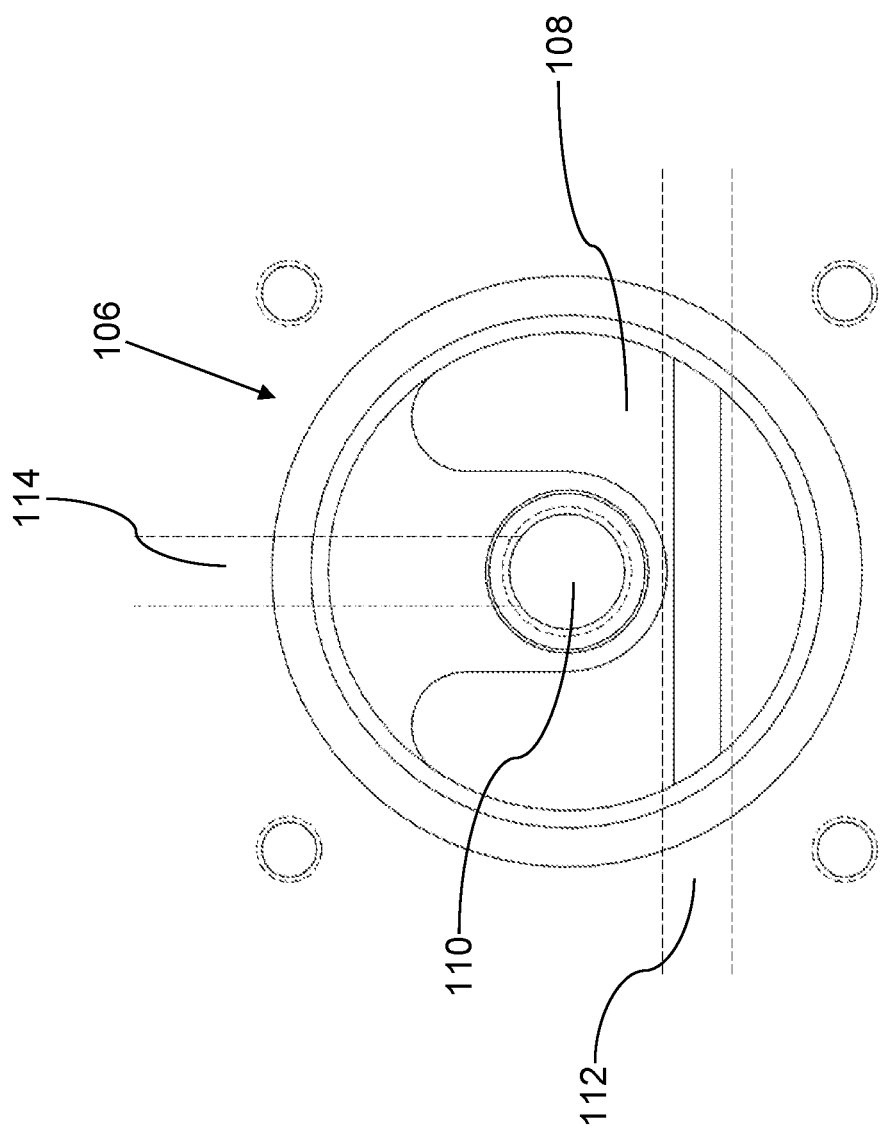
FIG. 6 is a detailed top plan view of a valve cavity.

Tire supply passages 114 form a fluid connection between tire supply chambers 110 and vehicle tires 14. A cross-section along line 5 in FIG. 3 is shown in FIG. 5 showing tire supply passage 114 and valve cavity 106. Tire supply passage may additionally include a supplemental valve 115, such as a typical Schrader valve, so that an air supply may be connected directly to tire 14, bypassing valve 120. Supplemental valve 115 can be used to fill or empty tire 14 when the pressure is below the threshold and valve element 122 is closed, or to provide a point at which the pressure of tire 14 can be manually tested. In the depicted example, both air supply passages 112 and tire supply passages 114 are shown to extend to the perimeter of unitary body 102 between first face 103 and second face 104. This is for ease of manufacturing supply passages and during normal operation will be sealed with sealing caps 119. Passages 112 and 114 may take other forms, depending on the preferences of the user, the manufacturing techniques used, and the material of unitary body 102

Unitary body 102 has attachment points 132 that allow valve assembly 100 to be mounted to a wheel end 15 of vehicle 20 using nuts 133. Wheel end 15 is used to refer generally to the structural component at the end of a vehicle axle, such as the rim, wheel assembly, axle end, etc. In one example, unitary body 102 may be mounted to studs (not shown) that are typically carried by, for example, the brake drum or brake disk of wheel end 15. It will be understood, however, that unitary body 102 may be mounted to any suitable structural component of wheel end 15. As shown, attachment points 132 are preferably a set of apertures sized and aligned to receive two or more studs (not shown) of tire 14, which allows valve assembly 100 to be mounted using similar equipment and tools to those used to install tires 14. Attachment points 132 may also consist of a plurality of sets of apertures that correspond to different stud patterns, as depicted in the current example. As shown, unitary body 102 has eighteen attachment points 132, permitting unitary body to be mounted to 9 different stud patterns. The number of attachment points 132 may be modified according to the preferences of the user, and the dimensions of unitary body 102.

There will now be described a method for manufacturing one example of a valve assembly 100. The method of manufacturing any given design may be modified based on the material being used, and using different manufacturing techniques. It will be also understood that the method may be modified to accommodate variations in the design permitted herein.

The method begins with obtaining a generally circular unitary body 102 with flat first and second faces 103 and 104. Initially, unitary body 102 may be a "blank", meaning it is a solid piece of metal cut into a squat, cylindrical shape. Unitary body 102 is then machined to have various elements, such as attachment points 132, one or more valve cavities 106, and a plurality of air passages. Attachment points 132 may be a set or a plurality of sets of apertures as described above. Air passages 112 and 114 are machined to be connected to the valve cavity 106, with air supply passages 112 in communication with valve 18 and tire supply passages 114 in communication with tires 14. A central aperture is preferably machined into unitary body 102 to be fitted with a bearing and valve assembly (not shown) that allows air supply passages 112 to be connected to valve 18 via air supply connector 116, which is capable of rotating relative to unitary body 102 while being connected to air supply 12 with air supply hoses 16. Flow restriction 113 may be machined as part of air supply passage 112. A supplemental port, to which valve 115 is connected, may be machined as part of tire supply passage 114. This allows the user to have the option of bypassing valves 120, such as for rapid inflation or deflation of tires 14, in the event of a failure of valves 120 or other component, or to provide a point at which the pressure of tire 14 may be tested.

Once the machining steps are completed, a valve element 122 is mounted to each of the valve cavities 106, such that an air supply chamber 108 in communication with air supply passage 112 and tire supply chamber 110 in communication with tire supply passage 114 are defined within valve cavity 106. Valve element 122 is biased toward a closed position that seals between air supply chamber 108 and the tire supply chamber 110 such that the valve element 122 moves to an open position upon the application of a predetermined pressure from within valve cavity 106 against valve element 122. This will normally be the range of expected operating pressures for tires 14. Valve element 122 may be a diaphragm, and there may be a cover 126 with a cover cavity 128 secured over top of valve element 122 such that the diaphragm is secured between valve cavity 106 and cover cavity 128 and is exposed to the tire pressure on the valve-facing side of the diaphragm and atmospheric pressure on the cover-facing side of the diaphragm. This may be done by providing a vent, such as a small orifice or other opening in cover 126, to maintain atmospheric pressure behind the diaphragm. Valve element 122 may be biased with the use of spring element 124 positioned between cover 126 and diaphragm.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A valve assembly for a tire pressure control system used to control tire pressure of a vehicle, the valve assembly comprising:
    a unitary body comprising attachment points for mounting the unitary body to a vehicle wheel end;
    one or more valves, each valve comprising:
        a valve cavity formed in the unitary body;
        a valve element mounted to the valve cavity, the valve element and the valve cavity defining an air supply chamber and a tire supply chamber within the valve, and the valve element being biased toward a closed position that seals between the air supply chamber and the tire supply chamber;
        an air supply passage in fluid communication with the air supply chamber and being adapted to connect to an air supply, the air supply passage comprising a flow restriction such that all air flowing to the air supply chamber passes through the flow restriction; and
        a tire supply passage in fluid communication with the tire supply chamber and adapted to connect to a vehicle tire that is carried by the vehicle wheel end, the air supply passage and the tire supply passage being connected to the valve cavity, the flow restriction having a reduced flow area relative to the tire supply passage;
        wherein the valve element moves to an open position that permits airflow between the air supply chamber and the tire supply chamber upon application of a sufficient pressure within the valve cavity against the valve element, and the reduced flow area of the flow restriction is sized to restrict the rate of air flow through the valve cavity during a tire pressure reduction event and cause the valve element to move to the closed position when air pressure in the tire supply chamber is below a threshold.

2. The valve assembly of claim 1, wherein each valve comprises a cover that overlies the valve cavity and the valve element, an inner surface of the cover defining a cover cavity, the valve element comprising a diaphragm secured between the valve cavity and the cover cavity, wherein the diaphragm is exposed to the tire pressure on a valve-facing side of the diaphragm, and atmospheric pressure on a cover-facing side of the diaphragm.

3. The valve assembly of claim 2, wherein the diaphragm is biased by a spring element positioned between the cover and the diaphragm.

4. The valve assembly of claim 2, wherein the cover comprises a vent that vents the cover cavity to atmosphere.

5. The valve assembly of claim 1, further comprising an air supply connector in communication with each of the air supply passages, the air supply connector being rotatable relative to the unitary body, the air supply connector being connected to an air supply hose from an air supply.

6. The valve assembly of claim 1, wherein each tire supply passage comprises a supplemental port for selectively connecting an alternate air passage from the air supply to the tire supply passage that bypasses the corresponding valve.

7. The valve assembly of claim 1, wherein the attachment points comprise a set of apertures sized and aligned to receive two or more studs carried by the vehicle wheel end.

8. The valve assembly of claim 7, wherein the attachment points comprise a plurality of sets of apertures sized to mount to different wheel stud patterns.

9. A method of manufacturing a valve assembly, comprising the steps of:
    obtaining a unitary body having a first face, a second face opposite the first face and separated by a thickness,
    machining the unitary body to form:
        attachment points for mounting the unitary body to a vehicle wheel end; and one or more valve cavities in the unitary body, each of the one or more valve cavities being connected to an air supply passage that is connectable to an air supply and a tire supply passage that is connectable to a vehicle tire carried by the vehicle wheel end, wherein each of the air supply passage and the tire supply passage are formed in the unitary body, and each air supply passage comprises a flow restriction having a reduced flow area relative to the tire supply passage such that all air flowing to the air supply chamber passes through the flow restriction;

forming one or more valves by mounting a valve element to each of the one or more valve cavities such that, for each of the one or more valves, the valve element defines an air supply chamber in communication with the air supply passage and a tire supply chamber in communication with the tire supply passage; and for each of the one or more valves, biasing the valve element toward a closed position that seals between the air supply chamber and the tire supply chamber such that the valve element moves to an open position that permits airflow between the air supply chamber and the tire supply chamber, the valve element moving to the open position upon application of a predetermined pressure within the valve cavity against the valve element, wherein the reduced flow area of the flow restriction is sized to restrict the rate of air flow from the valve cavity during a tire pressure reduction event and cause the valve element to move to the closed position when air pressure in the tire supply chamber is below a threshold.

10. The method of claim 9, wherein mounting a valve element comprising mounting a cover to the unitary body that overlies the valve cavity and the valve element, wherein an inner surface of the cover defining a cover cavity, and wherein the valve element comprises a diaphragm secured between the valve cavity and the cover cavity, such that the diaphragm is exposed to the tire pressure on a valve-facing side of the diaphragm, and atmospheric pressure on a cover-facing side of the diaphragm.

11. The method of claim 10, wherein biasing the valve element comprising biasing the diaphragm by a spring element positioned between the cover and the diaphragm.

12. The method of claim 10, wherein the cover cavity comprises a vent that is vented to atmosphere.

13. The method of claim 9, further comprising the steps of:
attaching an air supply connector to the unitary body in communication with each of the air supply passages, the air supply connector being rotatable relative to the unitary body; and
connecting the air supply connector to an air supply hose from an air supply.

14. The method of claim 9, wherein machining the tire supply passage comprises machining a supplemental port in fluid connection with the tire supply passage.

15. The method of claim 9, wherein the attachment points comprise a set of apertures sized and aligned to receive two or more wheel studs of the vehicle wheel end.

16. The method of claim 15, wherein the attachment points comprise a plurality of sets of apertures sized to mount to different wheel stud patterns.

* * * * *